US010469981B1

(12) United States Patent
Dannamaneni et al.

(10) Patent No.: US 10,469,981 B1
(45) Date of Patent: Nov. 5, 2019

(54) MOBILE PHONE MOBILE VIEWSHED ANALYSIS

(71) Applicant: Sprint Communications Company L.P., Overland Park, KS (US)

(72) Inventors: Prashanth Dannamaneni, Merriam, KS (US); Matthew Habiger, Kansas City, KS (US); Jared K. Harpole, Overland Park, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/944,512

(22) Filed: Apr. 3, 2018

(51) Int. Cl.
*H04W 4/02* (2018.01)
*G01S 19/47* (2010.01)
*G01S 5/06* (2006.01)
*G01S 19/05* (2010.01)
*G06Q 30/02* (2012.01)
*H04W 4/021* (2018.01)

(52) U.S. Cl.
CPC ............... *H04W 4/02* (2013.01); *G01S 5/06* (2013.01); *G01S 19/05* (2013.01); *G01S 19/47* (2013.01); *G06Q 30/0205* (2013.01); *H04W 4/021* (2013.01)

(58) Field of Classification Search
CPC ....... H04W 4/02; H04W 4/023; H04W 64/00; H04W 40/20; H04W 4/025; H04W 64/003; H04W 4/026; H04W 4/046; H04W 4/021; G01S 19/47; G01S 5/06; G01S 19/05
See application file for complete search history.

(56) References Cited

U.S. PATENT DOCUMENTS

| | | | |
|---|---|---|---|
| 8,391,836 B1 * | 3/2013 | Bolot | G06Q 30/02 455/408 |
| 8,589,318 B2 * | 11/2013 | Sundararajan | H04L 12/6418 706/12 |
| 9,122,693 B2 * | 9/2015 | Blom | G06F 16/173 |
| 9,326,096 B1 * | 4/2016 | Gatmir-Motahari | H04W 4/08 |

(Continued)

FOREIGN PATENT DOCUMENTS

GB 2516513 A * 1/2015 ............. G06T 15/00

OTHER PUBLICATIONS

Burcham, Robert H., et al., "Adapting Content Presentation Based on Mobile Viewsheds," filed Dec. 11, 2017, U.S. Appl. No. 15/838,016.

*Primary Examiner* — Magdi Elhag

(57) ABSTRACT

A method of generating imputed location fixes of a mobile communication device. The method comprises accessing event data created by a mobile communication device that comprises a time stamp, determining a plurality of location fixes of the mobile communication device, analyzing the location fixes to determine a plurality of location clusters associated with the mobile communication device, determining a location centroid of each location cluster, analyzing the location centroids and the time stamps of the event data, determining a travel route of the mobile communication device based on the analysis of location centroids and time stamps of event data, and determining a plurality of imputed location fixes of the mobile communication device at positions along the travel route of the mobile communication device, where the imputed location fixes comprise an imputed location and an imputed time stamp.

19 Claims, 11 Drawing Sheets

(56) References Cited

U.S. PATENT DOCUMENTS

| | | | |
|---|---|---|---|
| 10,332,151 B2* | 6/2019 | Megdal | G06Q 30/0261 |
| 2009/0150217 A1* | 6/2009 | Luff | G06Q 30/02 |
| | | | 705/7.32 |
| 2012/0040637 A1* | 2/2012 | Wigren | H04W 36/385 |
| | | | 455/404.2 |
| 2015/0149285 A1* | 5/2015 | Schroeter | G06Q 30/0261 |
| | | | 705/14.58 |
| 2017/0213240 A1* | 7/2017 | Waldron | G06F 16/29 |

* cited by examiner

MOBILE PHONE MOBILE VIEWSHED ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A viewshed may be considered to be the area that is visible from a given location. The concept can have application in the reciprocal sense: the viewshed of an object may be considered to be that area from which the subject object—such as a scenic roadside view, a point of historical interest marker, or a billboard—can be adequately seen or observed.

SUMMARY

In an embodiment, a method of generating imputed location fixes of mobile communication devices by an application executing on a computer system is disclosed. The method comprises accessing event data from a data store, where the event data is created by mobile communication devices that receive wireless communication service from a first wireless communication service provider and where the event data comprises a time stamp and identifies a cell site used by the mobile communication devices to transmit the event data to a wireless communication network. The method further comprises, for each of the mobile communication devices, for each predefined time duration period for which there are a plurality of event data items created by the mobile communication device, retaining one event data item and discarding the remaining event data items, based on the identity of the cell sites associated with the event data that is not discarded, determining a plurality of location fixes of the mobile communication device, analyzing the plurality of location fixes to determine a plurality of location clusters associated with the mobile communication device, determining a location centroid of each location cluster based on the location fixes comprising the location cluster. The method further comprises, for each of the mobile communication devices, for each location cluster, determining a cluster dwell time representing the duration of time spanned by the time stamps of the location fixes associated with the cluster, based on the dwell times of the clusters, determining a home census block associated with the mobile communication device, analyzing the location centroids and the time stamps of the event data, determining a travel route of the mobile communication device based on the analysis of location centroids and time stamps of event data, determining a plurality of imputed location fixes of the mobile communication device at positions along the travel route of the mobile communication device, where the imputed location fixes comprise an imputed location and an imputed time stamp, and based on the plurality of imputed location fixes of the mobile communication device, evaluating whether a mobile viewshed of the mobile communication device intersects a fixed viewshed of a digital billboard. The method further comprises, for each different home census block, determining an adjusted count of intersections based on multiplying a count of the mobile communication devices whose mobile viewshed is evaluated as intersecting the fixed viewshed of the digital billboard by a reciprocal of the fraction of wireless communication service market penetration of the first mobile communication service provider in the home census block and determining a count of intersections of mobile viewsheds with the fixed viewshed of the digital billboard by summing the adjusted counts.

In another embodiment, a method of generating imputed location fixes of a mobile communication device by an application executing on a computer system is disclosed. The method comprises accessing event data from a data store, where the event data is created by a mobile communication device and the event data comprises a time stamp and identifies a cell site used by the mobile communication device to transmit the event data to a wireless communication network, based on the identity of the cell sites associated with the event data, determining a plurality of location fixes of the mobile communication device, analyzing the plurality of location fixes to determine a plurality of location clusters associated with the mobile communication device, and determining a location centroid of each location cluster based on the location fixes comprising the location cluster. The method further comprises analyzing the location centroids and the time stamps of the event data, determining a travel route of the mobile communication device based on the analysis of location centroids and time stamps of event data, and determining a plurality of imputed location fixes of the mobile communication device at positions along the travel route of the mobile communication device, where the imputed location fixes comprise an imputed location and an imputed time stamp.

In yet another embodiment, a method of generating imputed location fixes of a mobile communication device by an application executing on a computer system is disclosed. The method comprises accessing event data from a data store, where the event data is created by a mobile communication device and the event data comprises a time stamp and identifies a cell site used by the mobile communication device to transmit the event data to a wireless communication network, based on the identity of the cell sites associated with the event data, determining a plurality of location fixes of the mobile communication device, analyzing the plurality of location fixes to determine a plurality of location clusters associated with the mobile communication device, and determining a location centroid of each location cluster based on the location fixes comprising the location cluster. The method further comprises analyzing the location centroids and the time stamps of the event data, determining a travel route of the mobile communication device based on the analysis of location centroids and time stamps of event data, determining a plurality of imputed location fixes of the mobile communication device at positions along the travel route of the mobile communication device, where the imputed location fixes comprise an imputed location and an imputed time stamp.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief descrip

DETAILED DESCRIPTION

Figure 1:
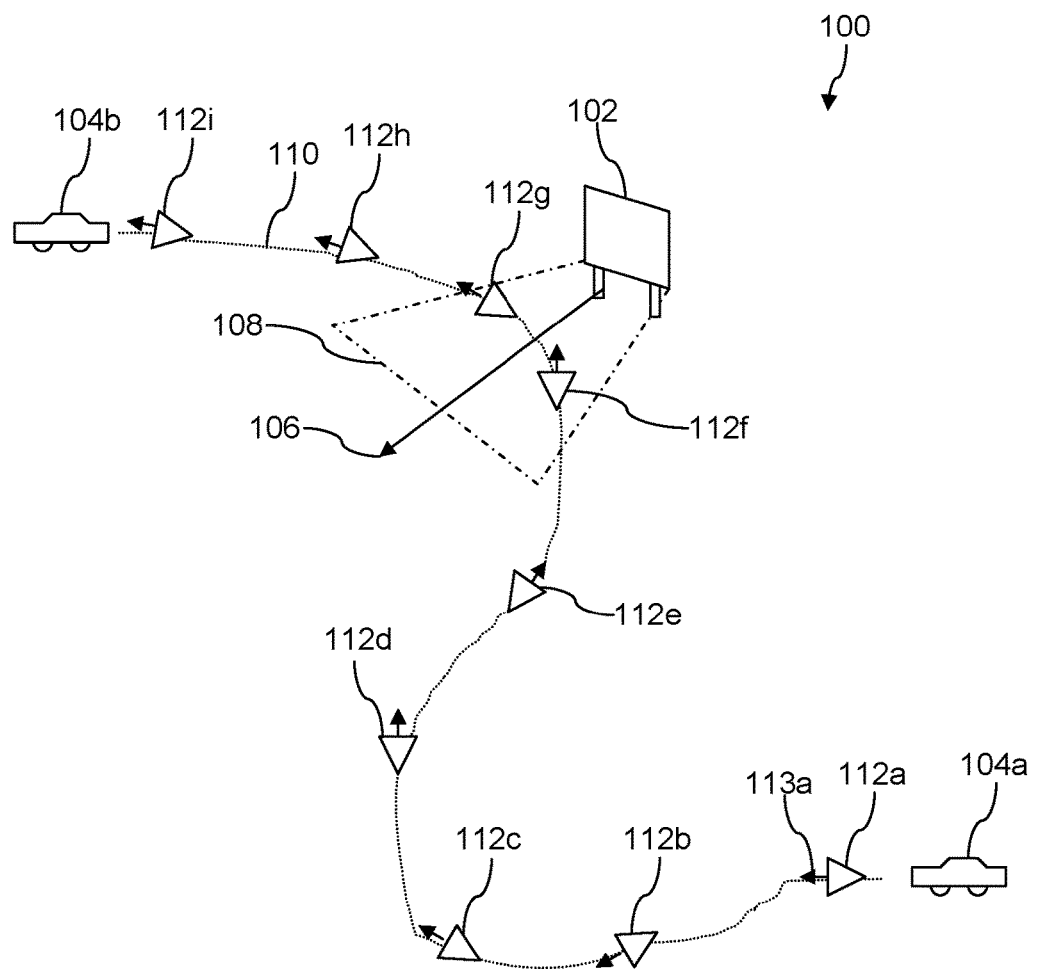
- FIG. 1 is an illustration of a vehicle commuting path according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches analyzing location fixes of mobile communication devices to synthesize imputed location fixes, determining mobile viewsheds of the mobile communication devices based on the imputed location fixes, and evaluating if the mobile viewsheds intersect with the fixed viewsheds of digital content presentation assets, for example the fixed viewsheds of digital billboards positioned alongside a highway. Position fixes of a mobile communication device collected while a subscriber associated with the device is driving in a vehicle may be sparsely distributed geographically because the vehicle may be moving rapidly and because the device may not be generating many events (e.g., communication messages between the device and a wireless network) while the subscriber is driving a vehicle. By performing cluster analysis on location fixes, by analyzing location time stamps, by analyzing location dwell times, and by inferring from these analyses a route taken by the mobile communication device (i.e., by a mobile communication device co-located with a subscriber driving a vehicle over the route), as many imputed location fixes of the device may be synthesized as desired along the inferred route. These imputed location fixes can then be used to determine mobile viewsheds. For further details on using mobile viewsheds, see U.S. patent application Ser. No. 15/838,016, filed Dec. 11, 2017, titled "Adapting Content Presentation Based on Mobile Viewsheds," by Robert H. Burcham, et al., which is hereby incorporated by reference herein in its entirety.

The mobile communication device may generate events, such as transmitting or receiving messages via a cell site, that can be captured by a wireless communication network and stored in a data store. Each captured event may identify an event type, a time stamp, and an identity of the cell site. The identity of the cell site can be associated to a fixed location of the cell site, and the location of the cell site can serve as a proxy for the approximate location of the mobile communication device at the time of the captured event. When the subscriber is not driving a vehicle, for example while working in an office or while relaxing at home, the mobile communication device may generate a plurality of events all associated with the same approximate location (i.e., the events may be captured by the same cell site). Additionally, because the subscriber is not driving a vehicle he or she may be interacting more frequently with the device, which itself may cause the generation of more events per unit of time.

These events can be accessed and analyzed by a computer program executing on a computer system using cluster analysis to identify a small number of clusters that group most or all of the locations of the events. A centroid of each cluster may be determined as the center of mass of all the location fixes associated with the cluster. A route between centroids of clusters may be inferred based on time stamps of the location fixes associated with the clusters. This inferred route may be a highway or a plurality of highways and may have any geometry (a series of connected straight line segments, a series of curved trajectories, or other geometry). Then, a plurality of imputed location fixes may be synthesized or created based on the time stamps of the location fixes associated with the clusters and based on the inferred route between the clusters. For example, if the location fixes associated with a first cluster all carry a time stamp earlier than all the time stamps of location fixes in a second cluster, a transit time between the first cluster and the second cluster may be determined as the time difference between the earliest time stamp in the second cluster and the latest time stamp in the first cluster. This transit time can be used to infer a vehicle speed for traveling along the route between the first and second cluster. Additionally, using this inferred vehicle speed, the time stamp of imputed location fixes between the centroids of the first and second cluster can be determined.

These imputed location fixes can be used to determine mobile viewsheds of the subscriber along the inferred route between the centroid of the first cluster and the centroid of the second cluster. These mobile viewsheds can then be analyzed to see if they intersect a fixed viewshed of an out-of-home content presentation asset, such as the fixed viewshed of a digital billboard. This analysis may further comprise determining an arcscore of the intersection between the mobile viewshed and the fixed viewshed, as described further below. The above analysis can be performed for a plurality of different and unassociated mobile communication devices to determine a sum of intersections between mobile viewsheds and a specific fixed viewshed or a sum of arcscores.

The results of the cluster analysis can be further analyzed to determine an inferred residence of the mobile communication device (i.e., where the subscriber lives) and associate this residence with a US census block geographical area. A market penetration factor of a wireless communication service provider in the census block area can be determined, and the count of intersections of mobile viewsheds (or the arcscores) of devices from that census block can be multiplied through by a reciprocal of that factor to arrive at a presumed summed count (or presumed summed arcscore) for all mobile communication devices. This may provide a more accurate assessment of intersections than would otherwise be possible if only the data collected from subscribers associated with a single wireless communication service provider were relied upon.

In an embodiment, the intersection analysis may be performed based on geographical tiles. For example, the geographical tiles that the route passes through may be determined. A list of out-of-home content presentation assets may be accessed to identify those that are located in the geographical tiles the route passes through. Then the intersection between the mobile viewsheds of the mobile communication device along that route with each of the out-of-home content presentation assets located in those geographical tiles are analyzed. This reliance on geographical tiles partitions the analysis space and reduces the magnitude of the computational problem, thereby making the calculations tractable. It is understood that the analysis of event data generated by each of hundreds of thousands of mobile communication devices is inherently an analysis performed on a computer system. Further, the systems and methods described herein constitute an improvement of the computation of these intersections of mobile viewsheds with fixed viewsheds.

The analysis of interactions of mobile viewsheds with fixed viewsheds may be performed periodically, for example daily, weekly, or monthly. The analysis may be performed for hundreds of thousands of mobile communication devices, millions of devices, or tens of millions of devices daily. Each device may be associated with a plurality of routes. The analysis may be performed with reference to thousands of out-of-home content presentation assets, tens of thousands of out-of-home content presentation assets, or hundreds of thousands of out-of-home content presentation assets.

A method of evaluating and analyzing an out-of-home content presentation asset, for example a digital billboard, may analyze movement of mobile communication devices (e.g., cell phones associated with human beings driving vehicles on a roadway) based on location fixes of those devices and based on analysis of behavioral profiles and demographic information associated with those devices is taught herein. The orientation of the human beings with reference to the orientation of the presentation assets is taken into account by the analysis (a human being driving towards and hence facing towards a billboard is more affected by the billboard than a human being driving away from and facing away from the billboard) as is the speed of the devices. By linking this analysis to the specific behavior profiles and demographics of the wireless communication service subscribers associated with the mobile communication devices, the characterization and evaluation of the interaction between the mobile human being and the digital asset can be specialized to targeted presentation needs. The evaluation information can be used to a variety of different purposes, such as choosing where to locate an out-of-home content presentation asset, conducting an auction of the right to present content on the content presentation asset (e.g., a digital presentation asset that can change the content it presents quickly and via remote communication), and coordinating presentation of content among a plurality of proximally located content presentation assets.

A viewshed may be defined for an out-of-home content presentation asset, for example a digital billboard. While many of the examples discussed herein will refer to such a digital billboard, the teachings of the disclosure may be advantageously utilized for other out-of-home content presentation assets that are not digital billboards. The viewshed comprises a definition of a geographical area from which content presented on the asset is deemed to be visible to human viewers and a definition of an orientation of the asset. The geographical area may define a polygonal area, for example a trapezoidal area, where the trapezoid opens out or is wider on the parallel side away from the asset and the narrower parallel side abuts the asset. The viewshed defines a location of the asset (in an embodiment, the location may be integral with the definition of the polygonal area, but alternatively the location may be specified independently of the area of the viewshed). The viewshed may further identify a geographical tile in which the asset is located. The direction of the asset may be defined as a ray directed out of one side of the plane of the asset (the side on which the content is presented). This direction may be normal or perpendicular to the plane of the asset, or it may be displaced angularly somewhat from the perpendicular to the plane of the asset. The viewshed of the out-of-home content presentation asset may be defined by an owner and/or operator of the asset. This viewshed definition may be stored in an electronic file or other data structure. A viewshed of a stationary content presentation asset may be considered to be static and unchanging, with the exception that the polygonal area and/or the orientation of the viewshed may be amended occasionally by an owner of the viewshed to correct errors or refine initial understandings of the viewshed of that asset. Notwithstanding that the viewshed may change occasionally, the viewshed associated with the content presentation asset will be referred to as the fixed viewshed hereinafter.

A mobile viewshed may be defined based on a plurality of location fixes of a mobile communication device as well as based on a plurality of imputed location fixes synthesized based on location fixes collected in a data store from device events. The mobile communication device may be thought of as a proxy for the human being who owns the device and is a wireless communication service subscriber associated with the device. Said in other words, the location fixes and imputed location fixes of the mobile communication device are assumed to be a proxy for the location of the subscriber/human being. The mobile communication device may be a cell phone, a smart phone, a personal digital assistant (PDA), a media player, a wearable computer, a headset computer, a laptop computer, a notebook computer, or a tablet computer. In an embodiment, the mobile communication device may be a telematics unit or head unit embedded in a motor vehicle.

The mobile viewshed, in a simple articulation, is a definition of a field of view attributed to a human being (i.e., the wireless communication service subscriber) at a point in time using that human being's mobile communication device as a proxy witness. Unlike the fixed viewshed associated with a content presentation asset described above, the mobile viewshed of a wireless service subscriber changes in time, for example as the subscriber commutes from home to work, commutes from work to home, drives from home to the grocery store, drives from home to a school program, etc. The mobile viewshed comprises a location, an orientation, a speed, a date, and a time. The mobile viewshed may further comprise behavior profile information and demographic information associated with the subscriber associated with the mobile communication device. Alternatively, in an embodiment, the mobile viewshed may further comprise a reference to behavior profile information and demographic information of the subscriber, for example a key to an entry in a data store of behavior profile information and demographic information.

An analysis application executing on a computer system can analyze location fixes and imputed location fixes of the device (and hence the locations of the subscriber) at different points in time. By taking any two location data points that are adjacent to each other in the time sequence, a direction and a speed of the device can be determined which, together with the two location fixes, can be used to establish a mobile viewshed—for example having a location mid-way between the two locations, having a time mid-way in time between the two time stamps, and having a speed determined based on the time taken to cross the distance between the two locations. The analysis application can determine a whole sequence of mobile viewsheds for a single device and store them in a data store for later processing. The analysis application can perform this process for a large number of other mobile communication devices in about the same area, for example in the Kansas City metroplex area or more specifically in the Overland Park area. This processing can be repeated for each of a plurality of areas or regions to complete this analysis across an entire wireless network coverage, for example across the entire United States, partitioned by region.

The analysis application can analyze mobile viewsheds of a single subscriber that are proximate to a fixed viewshed to determine if the fixed viewshed and the mobile viewsheds intersect. An intersection of a mobile viewshed with a fixed viewshed indicates that there is at least the possibility that the subscriber experienced or saw the content presented on the content presentation asset. Intersections of the fixed viewshed and the mobile viewsheds can be further analyzed to determine an arcscore. The arcscore represents, in a simple articulation, the intensity of the experience a subscriber is deemed to have of a content presentation asset. It is assumed that the slower the subscriber is moving, the more the orientation of the subscriber's mobile viewshed aligns with the fixed viewshed, the more intense the experience has of the content presented by the asset. In an embodiment, other factors, too, can be brought into consideration in determining the arcscore, for example traffic density (at equal speeds, the user may be less aware of the content presented on the asset when driving in heavy traffic and more aware of the content presented on the asset when driving in light traffic), precipitation, and lighting conditions. The arcscores of a plurality of different subscribers but associated with the same content presentation asset may be analyzed to evaluate the aggregate value of content presented on the asset or to evaluate the aggregate experience of the content.

The processing by the analysis application may be performed in a batch mode long after the subscribers have left the fixed viewshed of a content presentation asset. The arcscores can be aggregated over a day, over a week, over a month, and the aggregate set of arcscores analyzed in various ways. For example arscores associated with specifically defined kinds of subscribers can be selected and processed. For example, a content provider may wish to select only the arcscores associated with females with an income in the range $45,000 to $75,000. This content provider may look at how a sum of those selected arcscores change over time of day to select a best time to present their advertisement directed to this targeted kind of subscribers. This content provider may be willing to bid a much higher price to present their content on the content presentation asset knowing, based on deterministic, quantitative analysis, how much attention his or her content will receive from the target audience.

The information technology system and methods described herein enable efficient analysis of large volumes of data. The initial analysis of the location fixes to identify imputed mobile viewsheds can be stored and later used in a variety of ways. For example, an analysis can specify particular time windows and demographic profiles to be analyzed. In essence, this partitions the problem space, thereby reducing the analysis task to a more manageable scale, for example reducing the task of analyzing the intersection of mobile viewsheds with identified static or fixed viewsheds. Said in other words, an analysis that defines qualification criteria for inclusion in the analysis inherently excludes data from the analysis that does not meet the qualification criteria, thereby making the analysis of the selected data more tractable. The use of tiling for determining intersections of mobile viewsheds with static or fixed viewsheds of content presentation assets further enhance the efficiency of the solutions.

The arcscores may be used to evaluate where to locate and construct a new content presentation asset, for example by performing arcscore analysis based on candidate fixed viewsheds where the new asset might be located. The arcscores may be used to determine a rotation rate of content on the asset—how long content is presented before it is swapped with different content. The arcscores may be used to coordinate presentation of content on a series of adjacent content presentation assets. The arcscores may be used to select the nature of content to be presented on content presentation assets. For example, a variation of demographic characteristics with reference to time of mobile viewsheds intersecting a content presentation asset can be used to choose content for presentation that is better targeted to the varied demographic characteristics of the mobile viewsheds.

Further, because the patterns of mobile viewsheds may change over time, this system permits dynamically changing content that is presented on the content presentation assets. For example, a school fall break period or a school spring break period may be associated with fewer female profiles mixed into the mobile viewshed pool intersecting a given content presentation asset. This change can be algorithmically identified and dynamically adapted for by the system taught herein. A weather pattern such as icy roads may establish itself and persist for several days. This may alter patterns of driving, which can be algorithmically identified and dynamically adapted for by the system taught herein. Road construction can alter patterns of mobile viewsheds, which can be algorithmically identified and dynamically adapted for by the system taught herein.

The present disclosure further teaches a system and method of valuing a digital billboard based on analysis of movement of mobile communication devices (e.g., cell phones associated with human beings driving vehicles on a roadway) based on location fixes of those devices and based on analysis of behavioral profiles and demographic information associated with those devices is taught herein. The orientation of the human beings with reference to the orientation of the presentation assets is taken into account by the analysis (a human being driving towards and hence facing towards a billboard is more affected by the billboard than a human being driving away from and facing away from the billboard) as is the speed of the devices. By linking this analysis to the specific behavior profiles and demographics of the wireless communication service subscribers associated with the mobile communication devices, the valuation of the digital asset can be specialized to targeted presentation needs. This system is an information technology system based on computer system processing of large stores of data collected by other computer systems. The valuation information can be used to a variety of different purposes, such as choosing where to locate an out-of-home content presentation asset, conducting an auction of the right to present content on the content presentation asset (e.g., a digital presentation asset that can change the content it presents quickly and via remote communication), and coordinating presentation of content among a plurality of proximally located content presentation assets.

Turning now to FIG. 1, a driving environment 100 is described. In an embodiment a vehicle 104 traverses a path 110. The vehicle 104a represents the vehicle at the start of the path 110, and the vehicle 104b represents the vehicle at the end of the path 110. A mobile viewshed 112 is associated with the vehicle 104 (and with a mobile communication device of a subscriber inside of the vehicle 104). As the vehicle 104 traverses the path 110 a sequence of mobile viewsheds 112a, 112b, 112c, 112d, 112e, 112f, 112g, 112h, and 112i may be determined, for example by an analysis application executing on a computer system analyzing location data collected from mobile communication devices. It is understood that the location data can include location fixes determined from actual events associated with a mobile communication device (e.g., associated with a communication event between the device and a cell site) as well as imputed location fixes determined based on cluster analysis of location fixes. Each mobile viewshed 112 is associated with a mobile orientation 113, for example a first mobile orientation 113a associated with a first mobile viewshed 112a. The mobile orientation 113 indicates the direction of travel of the vehicle 104 (and hence of the mobile communication device and of the subscriber inside the vehicle 104). As vehicle 104 traverses the path 110 it may pass through a fixed viewshed 108 of a content presentation asset 102, for example a digital billboard. The fixed viewshed 108 has a location, a polygonal area, and a static orientation 106. Those mobile viewsheds 112 that are determined to be located within the polygonal area of the fixed viewshed 108 may be analyzed to determine an intensity of experience of any content presented by the asset 102, for example an arcscore.

Figure 2:
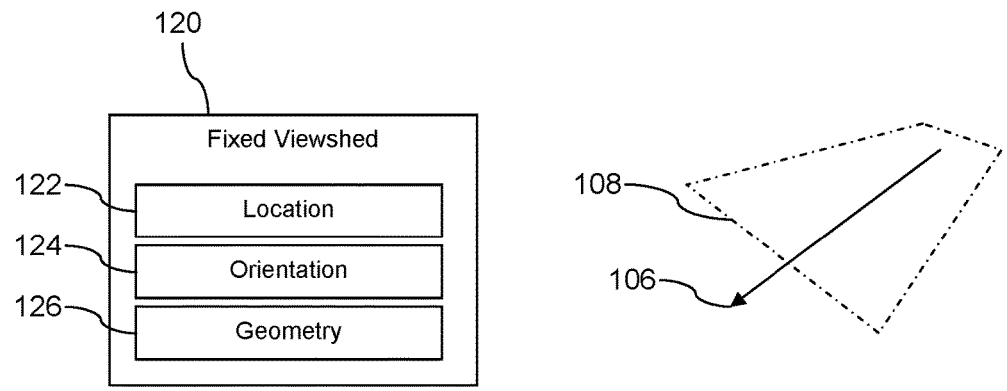
FIG. 2 is an illustration of a fixed viewshed according to an embodiment of the disclosure.

Turning now to FIG. 2, a fixed viewshed 120 is described. In an embodiment, the fixed viewshed 120 may be considered to be a composite data object that comprises a location 122, an orientation 124, and a geometry 126. In general, the data content of the fixed viewshed 120 reflects the information illustrated in FIG. 1 by the fixed viewshed polygon 108 and the static orientation 106. The values of the components of the fixed viewshed 120 may be defined in any way. In an embodiment, the location 122 and the geometry 126 may be combined, for example the definition of the geometry may imply the location 122. Alternatively, the location 122 may be defined separate from the geometry 126. The location 122 may comprise an identity of a geographic tile in which the fixed viewshed 120 is located. The geometry 126 may define a perimeter, for example a polygonal perimeter. The orientation 124 may be defined relative to the geometry 126 or relative to a universal geographic reference system. In an embodiment, the orientation 124 and the geometry 126 may be based on a flat 2-dimensional world (e.g., vehicles 104 and assets 102 are contained within the same 2-dimensional plane). In another embodiment, however, the orientation 124 and the geometry 126 may be based on a 3-dimensional world. For example the static orientation 124 may be defined both in azimuth and in elevation (or equivalent rotational coordinate systems). For example, the geometry 126 may be expressed in a more complex way than simply a polygonal perimeter but may be defined to indicate occultations of the asset due to terrain at some points in the fixed viewshed.

Figure 3:
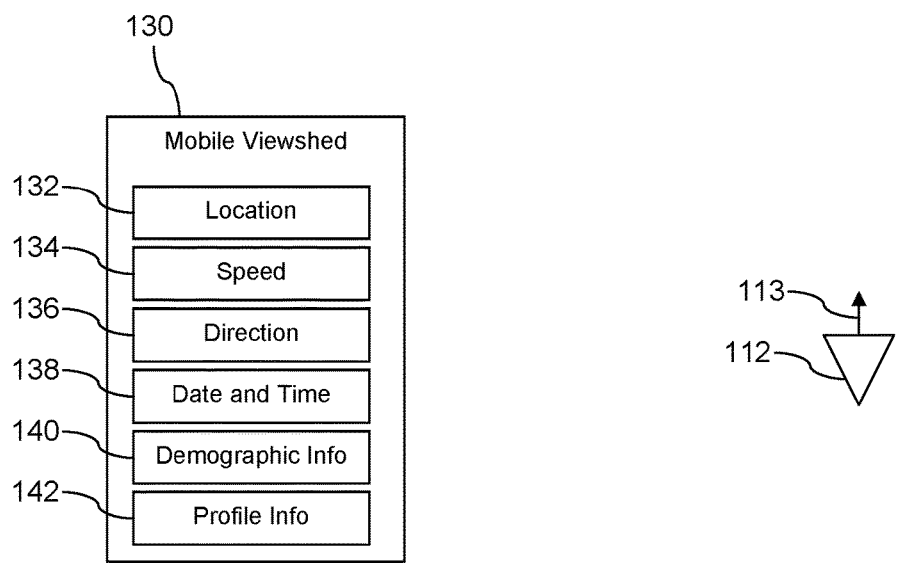
FIG. 3 is an illustration of a mobile viewshed according to an embodiment of the disclosure.

Turning now to FIG. 3, a mobile viewshed 130 is described. In an embodiment, the mobile viewshed 130 may be considered to be a composite data object that comprises a location 132, a speed 134, a direction 136, a date and time 138, demographic information 140, and behavior profile information 142. The location 132 may comprise an identity of a geographic tile that contains the mobile viewshed 130. In an embodiment, rather than storing demographic information 140 and behavior profile information 142 in the mobile viewshed 130 (remembering that there may be a substantial number of separate mobile viewsheds 130 associated with a single wireless communication subscriber), the information 140, 142 may be replaced by a reference, address, or pointer to demographic information and behavior profile information associated with the subject subscriber in a data store. In an embodiment, the mobile viewshed 130 comprises an identity of the subscriber and/or the mobile communication device, and this identity may be used to access the associated demographic information and behavior profile information in the data store.

The location 132 and speed 134 of the mobile viewshed 130 may be determined from a pair of location fixes or imputed location fixes that are adjacent in time associated with the mobile communication device. The location 132 may be deemed to be a mid-point location between the two location fixes or imputed location fixes and the speed 134 may be determined from the distance between the two location fixes or imputed location fixes and a time that has passed between the two location fixes. The location fixes may be transmitted by the mobile communication device along with a time-date stamp. Alternatively, the time and date that the location fix is received by a mobile communication network may be used to time-date stamp the subject location fix. The direction 136 may be determined as the direction the mobile communication device is assumed to have traveled in going from the location prior in time to the next location adjacent in time. To a first order of approximation, the direction 136 would be determined as the directed line from a first location A to the second location B. In other approximations another method of determining the direction 136 may be employed, for example a method that takes into consideration a trend indicated over three or more sequential location fixes.

The demographic information 140 (either stored in the mobile viewshed 130 or stored in a data store referred to by a reference in the mobile viewshed 130) may comprise one or more of an age or age category, a gender, an income category or partition, an education level, a residence location (e.g., a zip-code, a town of residence, a county of residence, a state of residence, a postal address, or other location), a marital status, and a number of children. The behavior profile information 142 may comprise one or more of number of mobile applications installed on a mobile communication device, frequency of on-line purchasing, dollar amount of on-line purchasing per unit of time, frequency of dining out, travel pattern information, number of different phone numbers the device conducted voice calls with per unit of time, and the number of text messages processed by the device per unit of time. The demographic information 140 and the behavior profile information 142 may comprise other information items also.

Figure 4:
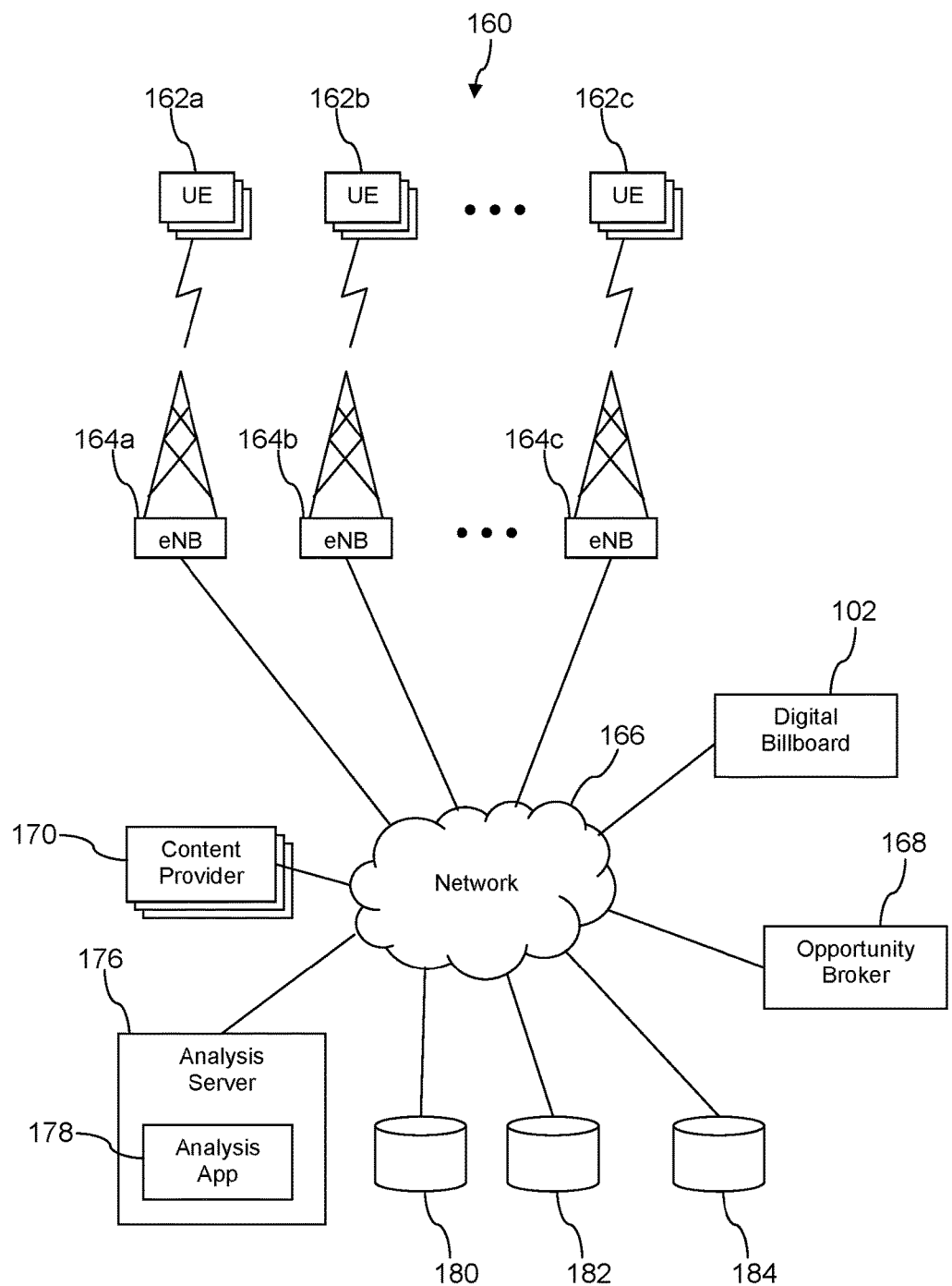
FIG. 4 is a block diagram of a communication system according to an embodiment of the disclosure.

Turning now to FIG. 4, a communication system 160 is described. In an embodiment, the system 160 comprises mobile communication devices (user equipments—UEs) 162, cell sites 164, and a network 166. For example, a first mobile communication device 162a may establish a wireless communication link with a first cell site 164a, a second mobile communication device 162b may establish a wireless communication link with a second cell site 164b, and a third mobile communication device 162c may establish a wireless communication link with a third cell site 164c. The cell sites 164 may provide wireless communication links according to a long term evolution (LTE), a code division multiple access (CDMA), a global system for mobile communications (GSM), a worldwide interoperability for microwave access (WiMAX), or other telecommunications wireless protocol. While three mobile communication devices 162 and three cell sites 164 are illustrated in FIG. 4, the system 160 may comprise tens of millions of mobile communications devices and tens of thousands of cell sites 164. The network 166 may be one or more private networks, one or more public networks, or a combination thereof.

The communication devices 162 may be employed by wireless communication service subscribers to complete voice calls, to send and receive text messages, to browse the Internet, and to execute mobile applications. In the course of normal operation these mobile communication devices 162 may self-determine their locations and transmit them to be stored in a device locations data store 180. Alternatively or in addition, as the mobile communication devices 162 communicate via the cell sites 164, the cell sites 164 capture events and store data about the events, including an identity of the cell site 164 (i.e., a proxy for the approximate location of the mobile communication device based on looking up a fixed location of the cell site 164) and a time stamp of the event, in the device locations data store 180. The entries in the device locations data store 180 may be data objects that comprise an identity of the device 162 (or the identity of the wireless communication service subscriber that owns the device 162), a location, a date, and a time. The devices 162 may self-locate using a global positioning system (GPS) receiver to determine its GPS coordinates. Alternatively, the devices 162 may self-locate based on trilateration techniques. The communication devices 162 may change location over time because the subscriber is in a moving vehicle, driving or riding as a passenger, such as is illustrated in FIG. 1. As the devices 162 move, they may come within the fixed viewshed 120 of a content presentation asset 102, for example a digital billboard. The content presented by the asset 102 may be sourced by content providers 170 and selected for presentation and later replacement by an opportunity broker 168. The content may be advertisements and/or public service announcements.

An analysis computer system 176 may execute an analysis application 178 that accesses the device locations data store 180 and analyzes the data to determine a plurality of mobile viewsheds 130. It is understood that the analysis application 178 may comprise a plurality of separate computer programs or separate applications. The analysis application 178 may determine a large number of mobile viewsheds 130 for each of a large number of subscribers and/or mobile communication devices 162 based on the location data and based on imputed location fixes stored in the device locations data store 180. The analysis application 178 may store the mobile viewsheds 130 in a viewshed data store 182. The viewshed data store 182 may store a number of fixed viewsheds 120 associated with content presentation assets 102, for example digital billboards. In an embodiment, the viewshed data store 182 may store billions of mobile viewsheds 130 and tens of thousands or hundreds of thousands of fixed viewsheds 120.

The analysis application 178 may analyze mobile viewsheds 130 to determine which of them intersect with or pass through a fixed viewshed 120 selected for analysis. The analysis application 178 may partition the set of all mobile viewsheds 130 stored in the viewshed data store 182 in some way to avoid having to examine each of more than a billion viewsheds. For example each of the mobile viewsheds 130 may be associated with a geographical tile, where each tile may be a delimited area of 5 miles by 5 miles, 10 miles by 10 miles, or some other area. A tile data store 184 may list all the geographical tiles by identity and/or by location coordinates and identify all the out-of-home content presentation assets located in each tile. When accessing mobile viewsheds 130 from the viewshed data store 182, the analysis application 178 may only access those from the same tile that the content presentation asset 102 is located in.

The analysis application 178 may further analyze the mobile viewsheds 130 that are deemed to intersect with the fixed viewshed 120 of interest to determine an arcscore for each of these intersecting mobile viewsheds 130. The arcscore may be determined as a number that is constrained to a particular range, for example from 0 to 1, from 0 to 10, from 0 to 100, or some other constrained numeric range. The arcscore may depend, at least in part, on an alignment of the orientation 124 of the fixed viewshed with the direction 136 of the mobile viewshed 130. The maximum alignment may occur when the orientation 124 is pointed directly at the direction 136. Said in another way, the maximum alignment may occur when the orientation 124 is 180 degrees offset from the direction 136 (e.g., if the orientation 124 is directed at a 180 degree angle relative to a given angular reference while the direction 136 is directed at a 0 degree angle relative to the same given angular reference). The minimum alignment may occur when the orientation 124 is pointed to the same bearing as the direction 136 (e.g., both the orientation 124 and the direction 136 are directed at 180 degree angle relative to a given angular reference). Alternatively, the minimum alignment may occur when the orientation 124 is pointed less than ±60 degrees away from the direction 136, less than ±90 degrees away from the direction 136, less than ±120 degrees away from the direction 136, or some other predefined threshold.

The arcscore may depend, at least in part, on the speed 134 of the mobile viewshed 130. The arcscore may depend, at least in part, on other factors related to visibility such as precipitation and daylight. In an embodiment, an arcscore may be determined as:

$$\text{arcscore} = \Pi_1^n f_1 \qquad \text{EQ 1}$$

where f is one of a plurality of n factors in a product that determines the arcscore. Each factor f may be constrained within a range of minimum and maximum values. As an example, in an embodiment, $f_1$ is an angle factor that is restricted to the range 0.3 to 1.0, $f_2$ is a speed factor that is restricted to the range 0.3 to 1.0. If the orientation 124 of the fixed viewshed 120 and the direction 136 of the mobile viewshed 130 are optimally aligned, the angle factor is 1 while if the orientation 124 of the fixed viewshed 120 and the direction 136 of the mobile viewshed 130 are poorly aligned, the angle factor is 0.3. If the speed 134 of the mobile viewshed 130 is less than a first predefined speed (e.g., less than 35 miles per hour) the speed factor is 1.0; if the speed is greater than a second predefined speed (e.g., more than 70 miles per hour) the speed factor is 0.3; and intermediate speeds between these values correspond to intermediate speed factors. Given these example values, if a mobile viewshed 130 (e.g., a subscriber in a vehicle 104) is traveling at 30 miles per hour within the geometry 126 of the fixed viewshed 120 and the orientation 124 of the fixed viewshed 120 is optimally aligned with the direction 136 of the mobile viewshed 130, the arcscore is 1.0—a maximum value corresponding to the most intense subscriber experience of content presented on the content presentation asset 102.

As another example, if a mobile viewshed 130 is traveling at 53 miles per hour within the geometry 126 of the fixed viewshed 120 and the orientation 124 of the fixed viewshed 120 is intermediately aligned with the direction 136 of the mobile viewshed 130, $f_1$ may be determined to be about 0.65, $f_2$ may be determined to be about 0.65, and the arcscore may be determined to be about 0.42. As yet another example, if a mobile viewshed 130 is traveling at 72 miles per hour within the geometry 126 of the fixed viewshed 120 and the orientation 124 of the fixed viewshed 120 is poorly aligned with the direction 136 of the mobile viewshed 130, $f_1$ may be determined to be about 0.3, $f_2$ may be determined to be about 0.3, and the arcscore may be determined to be about 0.1. These simple examples provide some illustration of how the factors that contribute to the intensity of a subscriber's experience of content presented on the content presentation asset 102 may be used to determine an arcscore. It is understood that any number of factors may be used and different constrained factor values may be applied in other embodiments. The arcscores can be used to a variety of purposes.

Arcscores can be calculated to evaluate where to locate and construct a new content presentation asset. Several candidate locations for a new content presentation asset may be identified and fixed viewsheds defined for them. The arcscores can then be calculated from these fixed viewsheds and the mobile viewsheds. The best arcscore total can be used to choose the spot to build the new content presentation asset. Alternatively, if the best arcscore total does not satisfy a minimum total, the idea of building the new content presentation asset may be discarded. Alternatively, a different set of candidate locations may be defined and analyzed in the same way. In some circumstances, evaluation of where to locate and construct a new content presentation asset may modify historic mobile viewshed data in various ways when using them to calculate a total arcscore for a candidate new content presentation asset location. For example, future growth may be assumed for the candidate areas and mobile viewshed counts may be increased proportionally. For example, arcscore valuation based on vehicle speeds may be decreased based on projecting greater traffic congestion in the future. Thus, this method of evaluating candidate locations for new content presentation assets can be performed based on projections of future conditions.

Arcscores can be used to evaluate a rotation rate of content on the asset—how long content is presented before it is swapped with different content. For example, if vehicles are moving fast, content may be presented longer, because any mobile viewer is only seeing the content for a limited period of time—the duration during which the content presentation asset is in view. By contrast, when vehicles are moving slow or are in stop-and-go traffic conditions, the content may be changed more frequently, on the consideration that the same mobile viewers will begin to disregard the content after it has been in view for ten seconds, for one minute, for two minutes. If the mobile viewer is moving quickly, and they only see the content for five seconds, it does not matter to them if the content is persistently presented for twenty minutes.

Arcscores can also be used to coordinate content on a series of adjacent content presentation assets. For example, a given content may be presented on a first digital content presentation asset and then presented on a second digital content presentation asset at a later time that aligns with an average traffic speed offset from the first asset, whereby a same mobile person may see the same content on two successive digital content presentation assets to better establish the message of the presentation content in his or her mind. For example, if the mobile person does not see the content for a sufficient duration of time on the first asset, the combination of seeing the same content on the first asset and then again on the second asset may be determinative for promoting the content sinking into his or her mind.

Figure 5:
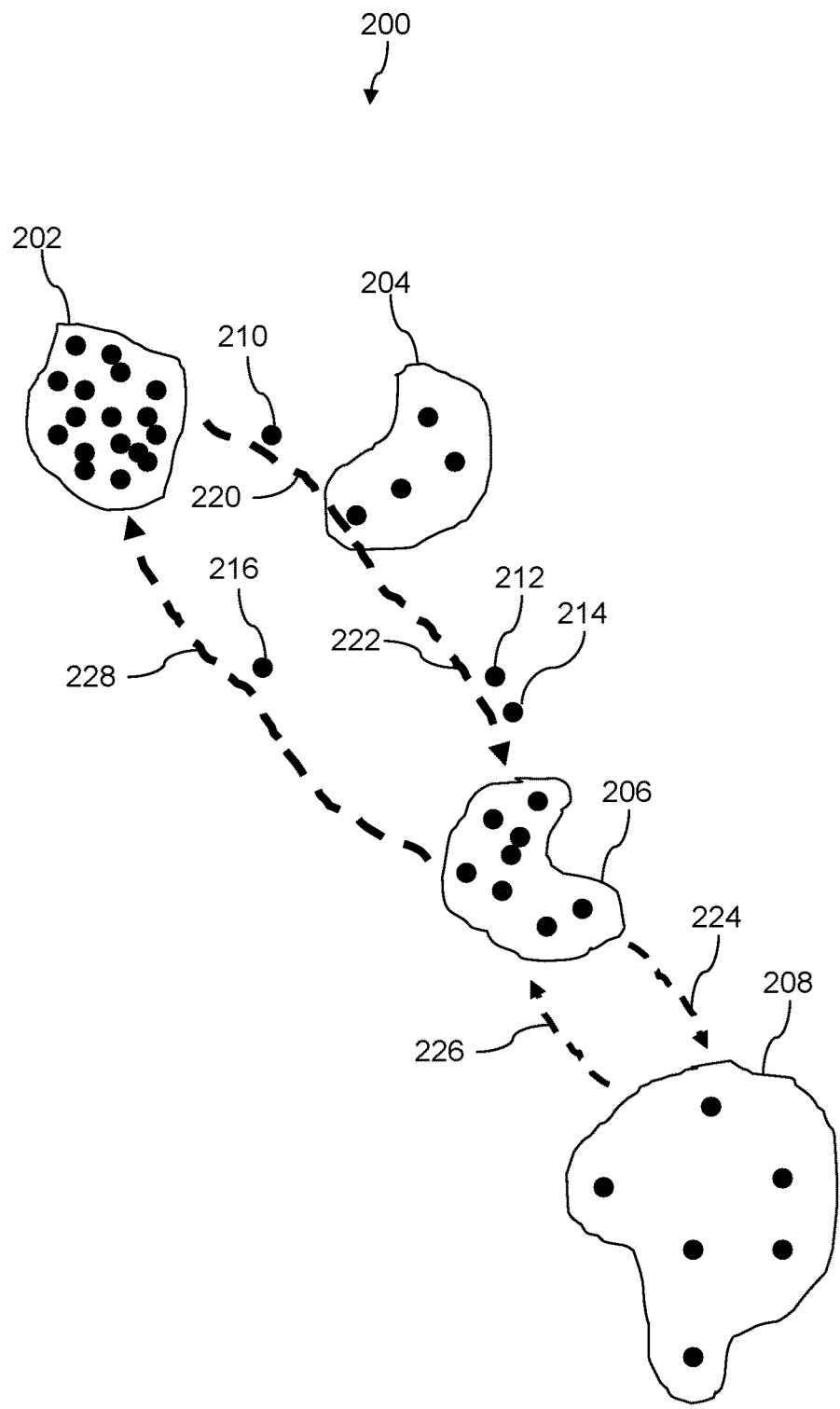
FIG. 5 is an illustration of clustered location fixes of a mobile communication device according to an embodiment of the disclosure.

Turning now to FIG. 5, an example illustration of a daily driving route 200 of a mobile communication device user is described. A plurality of location fixes, each represented by a black dot, are associated with a single mobile communication device 162. Each location fix is created by a communication event, for example a message transmitted from the mobile communication device 162 to the cell site 164 or a message transmitted from the cell site 164 to the mobile communication device 162. The location fix may be generated by the cell site 164 pursuant to the event and stored in the locations data store 180. Each of the location fixes comprises a location (for example a location of a cell site 164 which is deemed a proxy for the approximate location of the mobile communication device 162) and a time stamp.

In an embodiment, the location fixes to be analyzed all have a time stamp that falls within a predefined period of time, such as a 12-hour period, a 24-hour period, a 48-hour period, a week period, or other period of time. Said in other words, while location fixes may be retained in the locations data store 180 for longer periods of time, the analysis application 178 may only analyze or be concerned with those location fixes that fall within the predefined period of time.

The analysis application 178 (or a separate application such as a clustering application) executing on the analysis server 176 may associate some of the location fixes to a first cluster 202, to a second cluster 204, to a third cluster 206, and to a fourth cluster 208. Some of the location fixes—a first location fix 210, a second location fix 212, a third location fix 214, and a fourth location fix 216—may not be associated with any of the clusters 202, 204, 206, 208. For example, the analysis application 178 may analyze the location fixes using a clustering algorithm, for example the DBSCAN (density-based spatial clustering of applications with noise) or another clustering algorithm.

A centroid of each cluster 202, 204, 206, 208 may be determined as the centroid location of the location fixes associated with the subject cluster. The centroid location may be considered to be the "average location" of the location fixes associated with the subject cluster. For example, if a location fix comprises a pair of location coordinates (a latitude and a longitude, for example), the first ordered coordinate of the centroid would be the average of the first ordered coordinates of the location fixes of the cluster and the second ordered coordinate of the centroid would be the average of the second ordered coordinates of the location fixes of the cluster. The location of each cluster may be deemed to be the centroid location.

A dwell time of the mobile communication device 162 in each cluster may be determined as well as an earliest time and a latest time in each cluster. Based on earliest times and the latest times defined for each cluster, a travel sequence of the mobile communication device 162 may be defined, for example from the first cluster 202 to the second cluster 204, from the second cluster 204, to the third cluster 206, from the third cluster 206 to the fourth cluster 208. From the fourth cluster 208 to the third cluster 206, and from the third cluster 206 to the first cluster 202. The first cluster 202 may be a residence of the subscriber, the second cluster 204 may be associated with a café location that the subscriber stops at on the way to work, the third cluster 206 may be associated with a work location, and the fourth cluster 208 may be associated with a lunch restaurant location.

Analysis by the analysis application 178 may determine that the subscriber drives a first route 220 from the first cluster 202 to the second cluster 204, a second route 222 from the second cluster 204 to the third cluster 206, a third route 224 from the third cluster 206 to the fourth cluster 208, a fourth route 226 from the fourth cluster 208 to the third cluster 206, and a fifth route 228 from the third cluster 206 to the first cluster 202. In some cases, the combination of the first route 220 and the second route 222 may be substantially the same as the fifth route 228, with the provision that they are traversed in opposite directions (i.e., the streets traversed are the same but traversed in opposite directions). In some cases the third route 224 is substantially the same as the fourth route 226, with the provision that they are traversed in opposite directions. Alternatively, the first route 220 combined with the second route 222 may be different from the fifth route 228 (i.e., the subscriber drives home by a different pathway than he or she takes when driving to work in the morning, for example to make a detour to stop at a café in the morning), or the third route 224 may be different from the fourth route 226 (i.e., the subscriber returns from lunch by a different path to avoid heavy traffic caused by an automobile accident on the third route 224). The analysis application 178 may determine the routes 220, 222, 224, 226, 228 using highway mapping applications, for example using an open source routing machine (OSRM) route determination tool or other application. The highway mapping application may identify multiple possible routes or pathways between the first cluster 202 and the second cluster 204, from the second cluster 204 to the third cluster 206, from the third cluster 206 to the fourth cluster 208, from the fourth cluster 208 to the third cluster 206, and from the third cluster 206 to the first cluster 202 and may choose a fastest route among the possible routes. In an embodiment, the location fixes 210, 212, 214, 216 that are not associated with any of the clusters 202, 204, 206, 208 may be used to select one of the multiple routes identified by the highway mapping application as possible routes.

Having determined routes among the clusters 202, 204, 206, 208 imputed location fixes between the clusters 202, 204, 206, 208 may be synthesized and mobile viewsheds determined based on both location fixes and imputed location fixes. Any desired number of imputed location fixes may be synthesized for a route. In an embodiment, a predefined number of imputed location fixes per unit of travel distance may be determined, for example five imputed location fixes per mile, ten imputed location fixes per mile, 20 imputed location fixes per mile, or some other number of imputed location fixes per mile. In an embodiment, the number of imputed location fixes per unit of travel distance may vary with an area of a geographic tile in which the location fixes are located. Thus, for larger geographic tiles fewer imputed location fixes per mile are synthesized, and for smaller geographic tiles more imputed location fixes per mile are synthesized.

Figure 6:
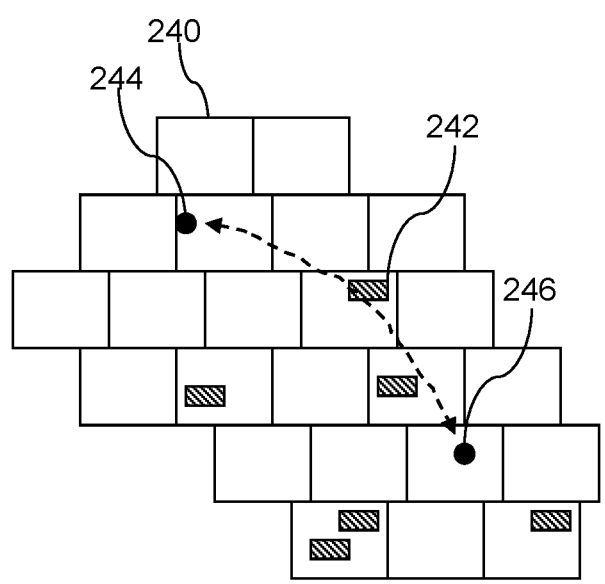
FIG. 6 is an illustration of geographical tiling according to an embodiment of the disclosure.

Turning now to FIG. 6, a plurality of geographic tiles 240 are illustrated. The geographic tiles 240 may be equal sized across a large area such as the extent of the United States. In another embodiment, the geographic tiles 240 may vary in size depending on a population density. For example, geographic tiles 240 in Wyoming may be bigger in area than geographic tiles 240 in New York City. In an embodiment, the size of geographic tiles 240 may be determined based on R-tree analysis. The number of objects that are analyzed to derive a size of geographic tiles 240 in this R-tree analysis may be a number of human beings residing per unit area, a number of mobile communication devices per unit area, a number of out-of-home content presentation assets per unit area, or some other number of objects per unit area. In an embodiment, the number of different geographic tile sizes may be less than 5, less than 20, or less than 100. In an embodiment, the area of the largest geographic tile may be at least 1000 times the area of the smallest geographic tile, may be at least 100 times the area of the smallest geographic tile, or may be at least 10 times the area of the smallest geographic tile.

As illustrated in FIG. 6, a mobile communication device (e.g., device 162) may move from a first point 244 to a second point 246. In examples, the points 244, 246 may be centroids of clusters. In traversing between the points, an imputed mobile viewshed 112 of the device traverses a plurality of tiles 240. One of the tiles 240 comprises a content presentation asset of interest 242. An analysis of intersections of mobile viewsheds 112 with the fixed viewshed 120 of the content presentation asset need only look at mobile viewsheds 112 that pass through the tile in which the subject fixed viewshed 120 is located, avoiding the analysis of mobile viewsheds 112 passing through all the other tiles 240, thereby reducing the analysis problem or reducing the analysis challenge.

A tile data store 184 may list all the tiles 240 by identity and/or by location coordinates and identify all the out-of-home content presentation assets located in each tile. Thus, by looking up a first tile it may be determined no presentation assets are located in that tile, looking up a second tile it may be determined there is one presentation asset in that tile, and looking up a third tile there may be two or more presentation assets located in that tile. When determining if the mobile viewsheds 112 of a mobile communication device 162 intersect a given fixed viewshed 120 of a given presentation asset, the analysis may be restricted to the mobile viewsheds 112 that are located in the same tile 240 as the subject fixed viewshed 120, thereby reducing the problem space and making the analysis simpler and more tractable.

In an embodiment, the routes 220, 222, 224, 226, 228 of a mobile communication device 162 may be determined, and only those routes 220, 222, 224, 226, 228 that cross a tile 240 containing presentation assets may be further analyzed to synthesize imputed location fixes and mobile viewsheds developed based on those imputed location fixes. In an embodiment, only those portions of routes that are located within a tile containing presentation assets are further analyzed to synthesize imputed location fixes and mobile viewsheds developed based on those imputed location fixes. In an embodiment, the analysis application 178 may determine more imputed location fixes per travel distance along a route 220, 222, 224, 226, 228 in tiles containing presentation assets and proximate to the presentation assets and may determine fewer imputed location fixes per travel distance along the same route 220, 222, 224, 226, 228 in the same tile but further away from the presentation assets.

Figure 7:
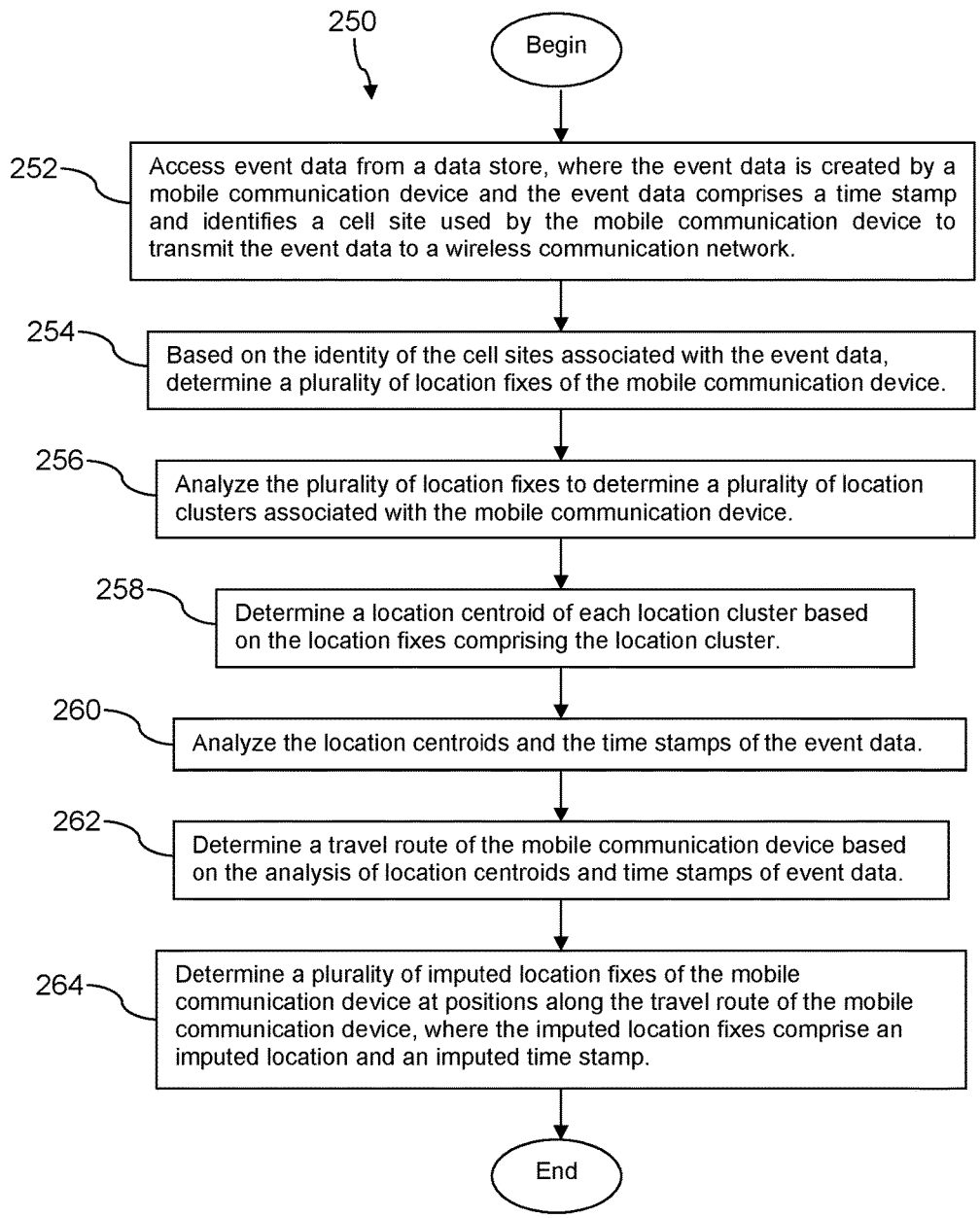
FIG. 7 is a flow chart of a method according to an embodiment of the disclosure.

Turning now to FIG. 7, a method 250 is described. The method 250 may be performed by one or more applications executing on a computer system, for example by the analysis application 178 executing on the analysis computer system 176. The processing of method 250 may be performed with reference to a single mobile communication device to determine a set of imputed location fixes associated with that single mobile communication device. The same processing of method 250 may be performed for each of a large number of other mobile communication devices in the same way. In an embodiment, the processing of method 250 may be performed by a plurality of parallel threads executing on a computer system, where each parallel thread is performing the processing of method 250 for a single mobile communication device.

At block 252, access event data from a data store, where the event data is created by a mobile communication device and the event data comprises a time stamp and identifies a cell site used by the mobile communication device to transmit the event data to a wireless communication network. For example, the analysis application 178 accesses event data from the device locations data store 180. At block 254, based on the identity of the cell sites 164 associated with the event data, determine a plurality of location fixes of the mobile communication device 162. For example, each item of event data may identify a cell site 164 which generated or received the item of event data, and this cell site identity may be used to look-up a location of the cell site 164 which is then used as a proxy for the approximate location of the mobile communication device 162.

At block 256, analyze the plurality of location fixes to determine a plurality of location clusters associated with the mobile communication device. The clustering algorithm can self-determine a number of clusters that best fit the location fixes of the subject mobile communication device. Alternatively, a predefined number of clusters may be provided to the algorithm, for example 3 clusters, 4 clusters, 5 clusters, 8 clusters or some small number of clusters. At block 258, determine a location centroid of each location cluster based on the location fixes comprising the location cluster.

At block 260, analyze the location centroids and the time stamps of the event data. For example, order the event data in order of time stamps. Determine when time stamps of events associated with different clusters are intermingled (some time stamps of the third cluster 206 are earlier than any time stamps of the fourth cluster 208, but some time stamps of the third cluster 206 are later than any time stamps of the fourth cluster 208, indicating that the mobile communication device 162 traveled from the third cluster 206 to the fourth cluster 208 and then returned to the third cluster 206).

At block 262, determine a travel route of the mobile communication device based on the analysis of location centroids and time stamps of event data. At block 264, determine a plurality of imputed location fixes of the mobile communication device at positions along the travel route of the mobile communication device, where the imputed location fixes comprise an imputed location and an imputed time stamp. For example, when traveling from cluster A to cluster B, the travel time may be deemed the duration from the last time stamp of an event in cluster A before the most proximate later time stamp of an event in cluster B. This may be analyzed, based on this time duration and a distance of the travel route determined in block 262, to determine an average speed.

The distance of the travel route from the centroid of cluster A to the centroid of cluster B may be evenly partitioned to find a predefined number of imputed location fixes, for example 10 imputed location fixes, 20 imputed location fixes, or some other number. The time duration can be divided by this predefined number of imputed location fixes. Each subsequent imputed location fix is assigned a time stamp that is an additional time duration increment later than the previous imputed location fix—from the starting cluster centroid to the ending cluster centroid. Thus, if the mobile communication device leaves cluster A at 10 AM, arrives at cluster B at 10:30 AM, and the route is defined to have 5 imputed location fixes, a first imputed location fix may be assigned a time stamp of 10:05 AM, a second imputed location fix a time stamp of 10:10 AM, a third imputed location fix a time stamp of 10:15 AM, a fourth imputed location fix a time stamp of 10:20 AM, and a fifth imputed location fix a time stamp of 10:25 AM, where the mobile communication device travels from the centroid of cluster A to the first imputed location fix, from the first imputed location fix to the second imputed location fix, from the second imputed location fix to the third imputed location fix, from the third imputed location fix to the fourth imputed location fix, from the fourth imputed location fix to the fifth imputed location fix, and from the fifth imputed location fix to the centroid of cluster B. With these imputed location fixes thus determined, mobile viewsheds may be determined based on the imputed location fixes, as described further above. These mobile viewsheds, further, can be used for various purposes such as determining intersections of mobile viewsheds with fixed viewsheds as discussed further above.

Figure 8A:
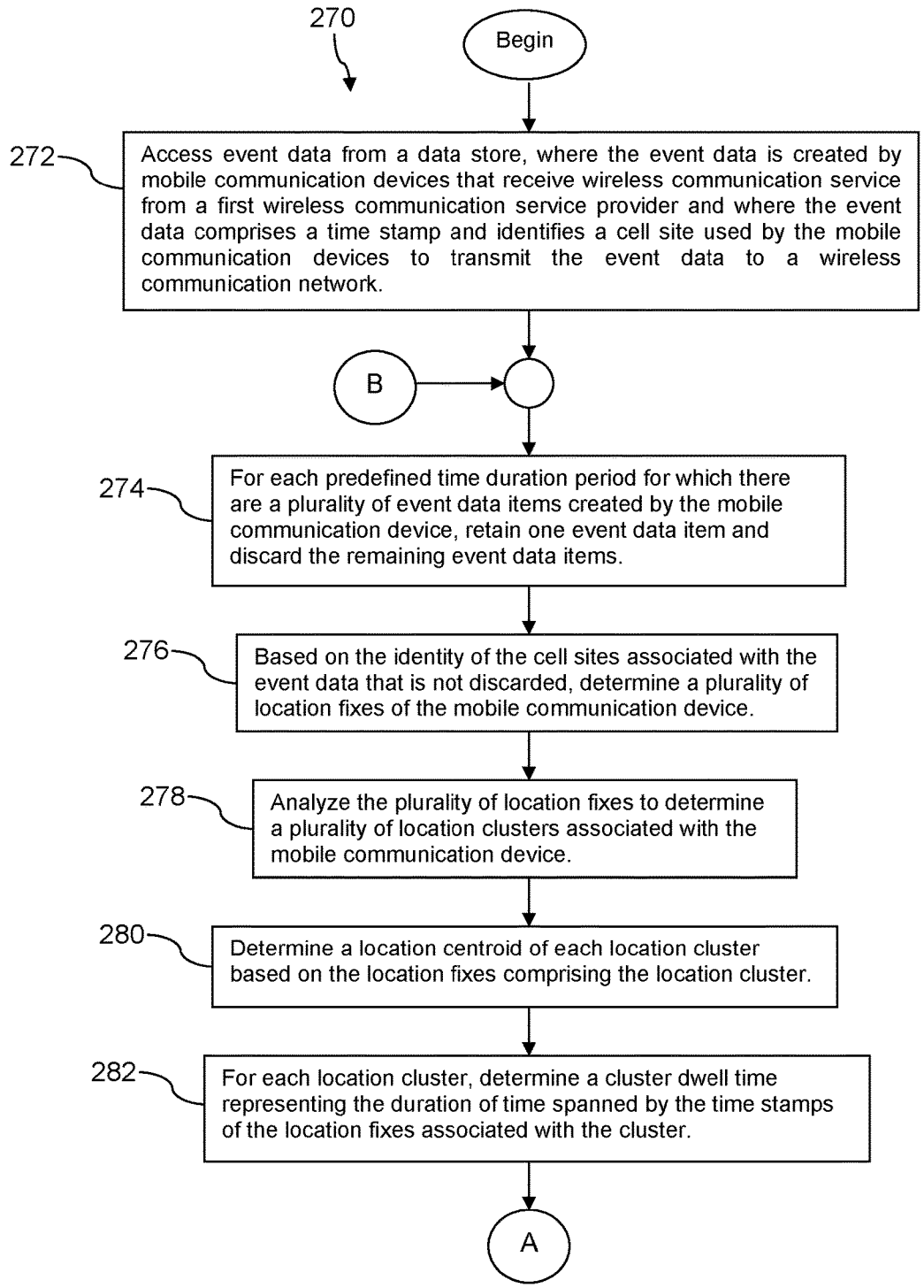
FIG. 8A and FIG. 8B is a flow chart of another method according to an embodiment of the disclosure.
Figure 8B:
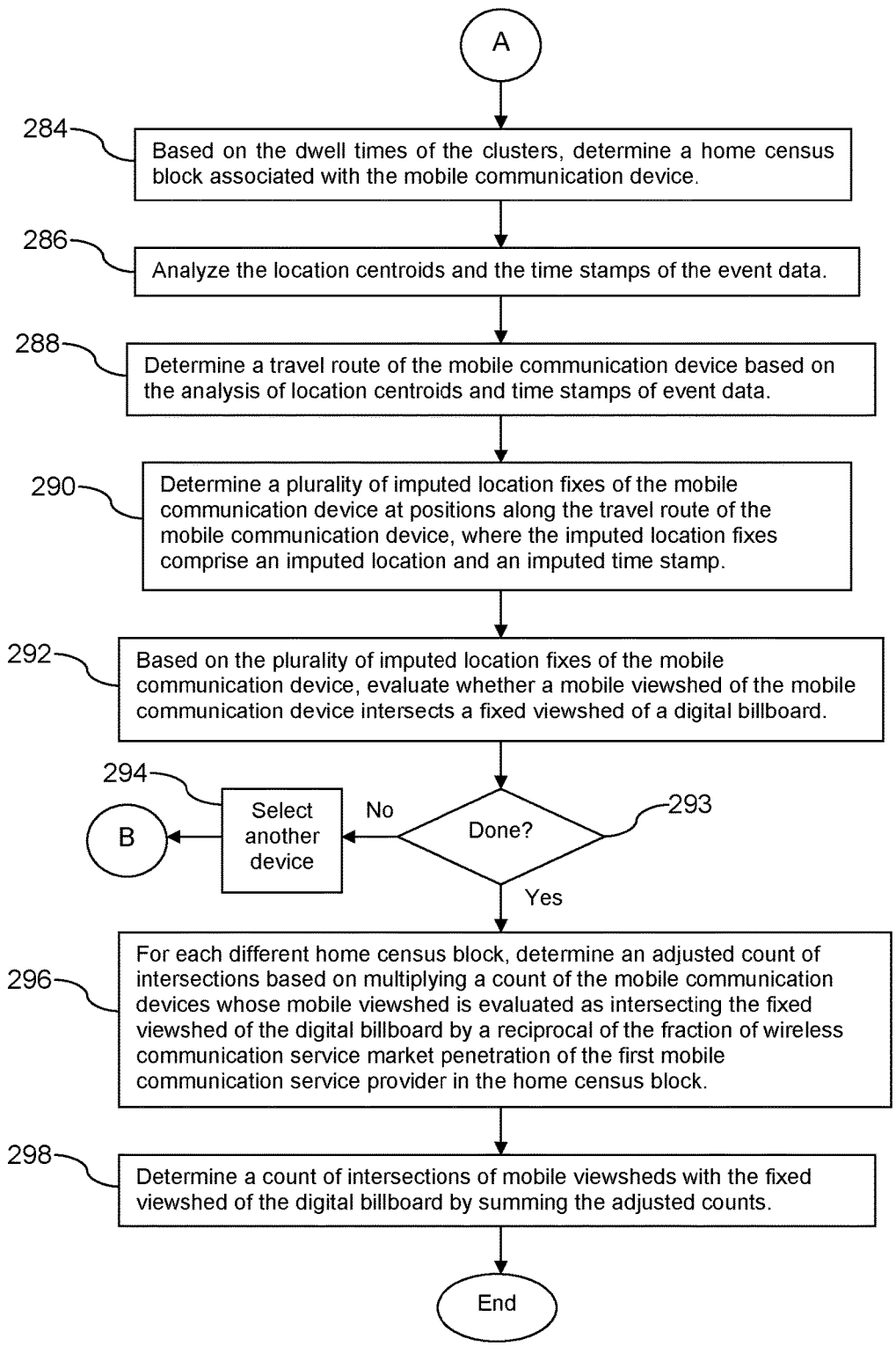

Turning now to FIG. 8A and FIG. 8B, a method 270 is described. The method 270 may be performed by one or more applications executing on a computer system, for example by the analysis application 178 executing on the analysis computer system 176. At block 272, access event data from a data store, where the event data is created by mobile communication devices that receive wireless communication service from a first wireless communication service provider and where the event data comprises a time stamp and identifies a cell site used by the mobile communication devices to transmit the event data to a wireless communication network. At block 274, for each predefined time duration period for which there are a plurality of event data items created by the mobile communication device, retain one event data item and discard the remaining event data items. For example, in an embodiment if a plurality of event data items are time stamped within a 20 second time interval, one event data item is retained and the other event data items from the same 20 second time interval are dropped from further analysis. The dropped event data items may be retained in the device locations data store 180 for use by other applications and services.

At block 276, based on the identity of the cell sites associated with the event data that is not discarded, determine a plurality of location fixes of the mobile communication device. At block 278, analyze the plurality of location fixes to determine a plurality of location clusters associated with the mobile communication device. At block 280, determine a location centroid of each location cluster based on the location fixes comprising the location cluster.

At block 282, for each location cluster, determine a cluster dwell time representing the duration of time spanned by the time stamps of the location fixes associated with the cluster. At block 284, based on the dwell times of the clusters, determine a home census block associated with the mobile communication device. The processing of block 284 may be performed relatively infrequently, for example once per month. Alternatively, the processing of block 284 may be performed based on dwell times of clusters determined over a plurality of days, for example over about a month's time. The cluster having the longest duration dwell time may be deemed associated with a residence of the subscriber of the mobile communication device. The centroid of the cluster containing the residence may be analyzed to determine what US census bureau block it is located in, and this census block be deemed the home census block associated with the mobile communication device.

At block 286, analyze the location centroids and the time stamps of the event data. At block 288, determine a travel route of the mobile communication device based on the analysis of location centroids and time stamps of event data. At block 290, determine a plurality of imputed location fixes of the mobile communication device at positions along the travel route of the mobile communication device, where the imputed location fixes comprise an imputed location and an imputed time stamp. At block 292, based on the plurality of imputed location fixes of the mobile communication device, evaluate whether a mobile viewshed of the mobile communication device intersects a fixed viewshed of a digital billboard.

At block 293, if location fixes associated with another mobile communication device remain to be analyzed, at block 294 select another mobile communication device and return to the processing of block 274. The processing of blocks 274, 276, 278, 280, 282, 284, 286, 288, 290, and 292 may be performed iteratively, each iteration performed for a single mobile communication device, for example each mobile communication device receiving wireless communication service from a wireless communication service provider or for each participating mobile communication device receiving wireless communication service from the wireless communication service provider.

Otherwise, at block 296, for each different home census block, determine an adjusted count of intersections based on multiplying a count of the mobile communication devices whose mobile viewshed is evaluated as intersecting the fixed viewshed of the digital billboard by a reciprocal of the fraction of wireless communication service market penetration of the first mobile communication service provider in the home census block. Not wishing to be bound by theory, the processing of block 296 theoretically adjusts the count of intersections of mobile viewsheds of all mobile communication devices with the fixed viewshed of a content presentation asset, not just those that receive service from the subject wireless communication service provider. At block 298, determine a count of intersections of mobile viewsheds with the fixed viewshed of the digital billboard by summing the adjusted counts.

Figure 9A:
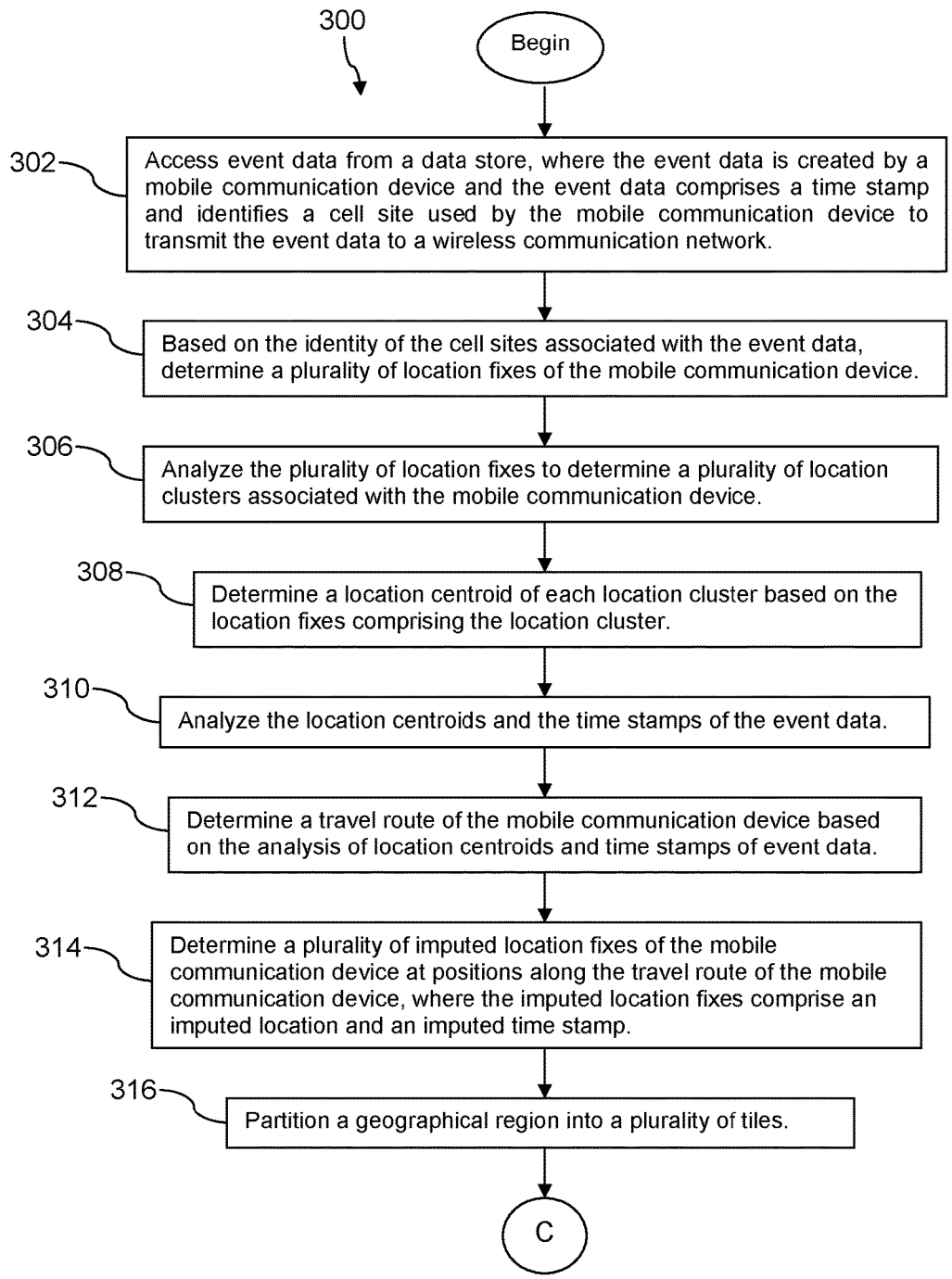
FIG. 9A and FIG. 9B is a flow chart of a method according to an embodiment of the disclosure.
Figure 9B:
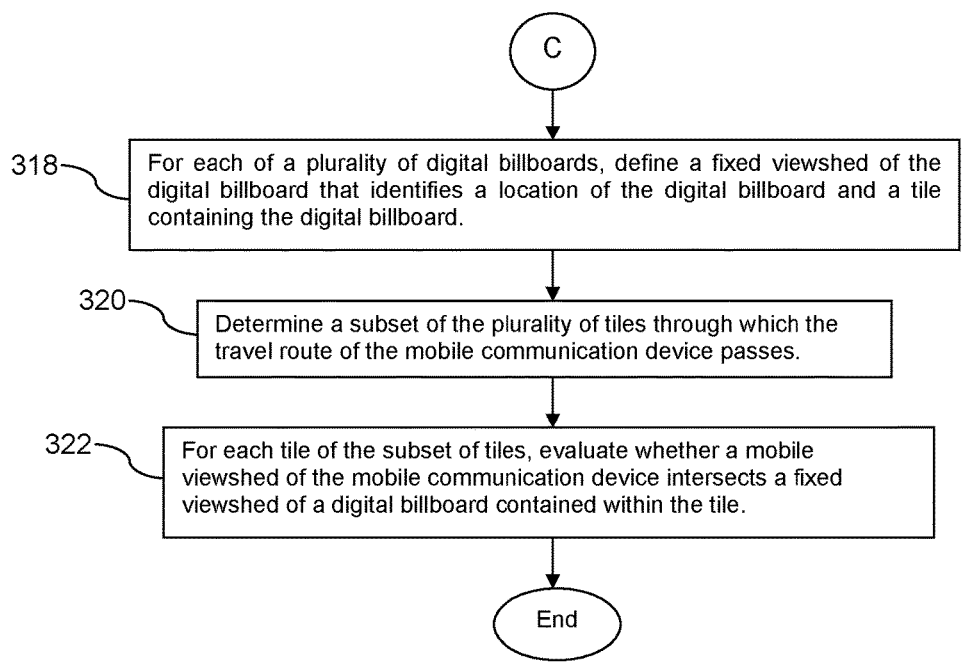

Turning now to FIG. 9A and FIG. 9B, a method 300 is described. The method 300 may be performed by one or more applications executing on a computer system, for example by the analysis application 178 executing on the analysis computer system 176. At block 302, access event data from a data store, where the event data is created by a mobile communication device and the event data comprises a time stamp and identifies a cell site used by the mobile communication device to transmit the event data to a wireless communication network. At block 304, based on the identity of the cell sites associated with the event data, determine a plurality of location fixes of the mobile communication device. At block 306, analyze the plurality of location fixes to determine a plurality of location clusters associated with the mobile communication device.

At block 308, determine a location centroid of each location cluster based on the location fixes comprising the location cluster. At block 310, analyze the location centroids and the time stamps of the event data. At block 312, determine a travel route of the mobile communication device based on the analysis of location centroids and time stamps of event data.

At block 314, determine a plurality of imputed location fixes of the mobile communication device at positions along the travel route of the mobile communication device, where the imputed location fixes comprise an imputed location and an imputed time stamp. At block 316, partition a geographical region into a plurality of tiles (also referred to as geographic tiles). At block 318, for each of a plurality of digital billboards, define a fixed viewshed of the digital billboard that identifies a location of the digital billboard and a tile containing the digital billboard. In an embodiment, the processing of block 318 further comprises generating a file that indexes each tile to any digital billboards located within the tile. The processing of block 318 may further be performed for other out-of-home presentation assets in addition to digital billboards.

At block 320, determine a subset of the plurality of tiles through which the travel route of the mobile communication device passes. At block 322, for each tile of the subset of tiles, evaluate whether a mobile viewshed of the mobile communication device intersects a fixed viewshed of a digital billboard contained within the tile.

Figure 10:
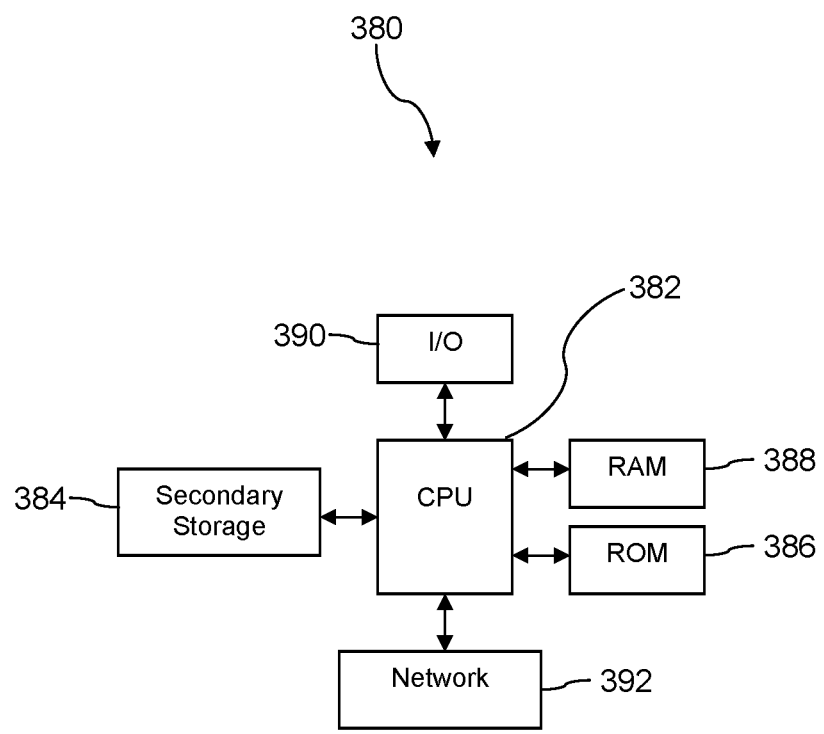
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of generating imputed location fixes of a mobile communication device by an application executing on a computer system, comprising:
    accessing event data from a data store, where the event data is created by a mobile communication device and the event data comprises a time stamp and identifies a cell site used by the mobile communication device to transmit the event data to a wireless communication network;
    based on the identity of the cell sites associated with the event data, determining a plurality of location fixes of the mobile communication device;
    analyzing the plurality of location fixes to determine a plurality of location clusters associated with the mobile communication device;
    determining a location centroid of each location cluster based on the location fixes comprising the location cluster;
    analyzing the location centroids and the time stamps of the event data;
    determining a travel route of the mobile communication device based on the analysis of location centroids and time stamps of event data;
    determining a plurality of imputed location fixes of the mobile communication device at positions along the travel route of the mobile communication device, where the imputed location fixes comprise an imputed location and an imputed time stamp;
    partitioning a geographical region into a plurality of tiles;
    for each of a plurality of digital billboards, defining a fixed viewshed of the digital billboard that identifies a location of the digital billboard and a tile containing the digital billboard;
    determining a subset of the plurality of tiles through which the travel route of the mobile communication device passes; and
    for each tile of the subset of tiles, evaluating whether a mobile viewshed of the mobile communication device intersects a fixed viewshed of a digital billboard contained within the tile.

2. The method of claim 1, wherein the partitioning of the geographical region into a plurality of tiles is performed using R-tree analysis.

3. The method of claim 2, wherein the number of objects analyzed to derive a size of tiles is based on a number of human beings residing per unit area.

4. The method of claim 2, wherein the number of objects analyzed to derive a size of tiles is based on a number of mobile communication devices per unit area.

5. The method of claim 2, wherein the number of objects analyzed to derive a size of tiles is based on a number of out-of-home content presentation assets per unit area.

6. The method of claim 1, wherein the mobile communication device is one of a cell phone, a smart phone, a personal digital assistant (PDA), a media player, a wearable computer, a headset computer, a laptop computer, a notebook computer, or a tablet computer.

7. A method of generating imputed location fixes of a mobile communication device by an application executing on a computer system, comprising:
    accessing event data from a data store, where the event data is created by a mobile communication device and the event data comprises a time stamp and identifies a cell site used by the mobile communication device to transmit the event data to a wireless communication network;

based on the identity of the cell sites associated with the event data, determining a plurality of location fixes of the mobile communication device;

analyzing the plurality of location fixes to determine a plurality of location clusters associated with the mobile communication device;

determining a location centroid of each location cluster based on the location fixes comprising the location cluster;

analyzing the location centroids and the time stamps of the event data;

determining a travel route of the mobile communication device based on the analysis of location centroids and time stamps of event data;

determining a plurality of imputed location fixes of the mobile communication device at positions along the travel route of the mobile communication device, where the imputed location fixes comprise an imputed location and an imputed time stamp;

determining mobile viewsheds based on the imputed location fixes, wherein each of the mobile viewsheds define a field of view attributed to a user of the mobile communication device at a point in time and comprise a location, an orientation, a speed, a date, and a time; and determining intersections between the mobile viewsheds and a fixed viewshed defined for a digital billboard.

8. The method of claim 7, wherein the mobile communication device is one of a cell phone, a smart phone, a personal digital assistant (PDA), a media player, a wearable computer, a headset computer, a laptop computer, a notebook computer, or a tablet computer.

9. The method of claim 7, wherein determining the plurality of location fixes based on the identity of the cell sites comprises using the identity of the cell sites to look up locations of the cell sites and using the locations of the cell sites as a proxy for the location fixes of the mobile communication device.

10. The method of claim 7, wherein the analyzing the plurality of location fixes to determine the plurality of location clusters is performed using DBSCAN clustering algorithm.

11. The method of claim 7, wherein determining the travel route of the mobile communication device is performed using an open source routing machine (OSRM) tool.

12. The method of claim 7, wherein the digital billboard is defined to be located in a geographic tile and determining intersections between the mobile viewsheds and the fixed viewshed is based on determining if the travel route of the mobile communication device pass through the geographic tile in which the digital billboard is located.

13. The method of claim 7, wherein the location centroid of a location cluster is determined by averaging the sum of the values of a first coordinate of a coordinate pair of each location fix in the location cluster to determine a first coordinate of the location centroid and by averaging the sum of values of a second coordinate of the coordinate pair of each location fix in the location cluster to determine a second coordinate of the location centroid.

14. The method of claim 7, further comprising, for each predefined time duration period for which there are a plurality of event data items created by the mobile communication device, retaining one event data item and discarding any remaining event data items, wherein the plurality of location fixes of the mobile communication device are determined based on the identity of the cell sites associated with the event data that is not discarded.

15. The method of claim 14, wherein the predefined time duration period is about 20 seconds.

16. A method of generating imputed location fixes of a mobile communication device by an application executing on a computer system, comprising:

accessing event data from a data store, where the event data is created by a mobile communication device and the event data comprises a time stamp and identifies a cell site used by the mobile communication device to transmit the event data to a wireless communication network;

based on the identity of the cell sites associated with the event data, determining a plurality of location fixes of the mobile communication device;

analyzing the plurality of location fixes to determine a plurality of location clusters associated with the mobile communication device;

for each location cluster, determining a cluster dwell time representing the duration of time spanned by the time stamps of the location fixes associated with the cluster;

based on the dwell times of the clusters, determining a home census block associated with the mobile communication device;

determining a location centroid of each location cluster based on the location fixes comprising the location cluster;

analyzing the location centroids and the time stamps of the event data;

determining a travel route of the mobile communication device based on the analysis of location centroids and time stamps of event data;

determining a plurality of imputed location fixes of the mobile communication device at positions along the travel route of the mobile communication device, where the imputed location fixes comprise an imputed location and an imputed time stamp; and determining mobile viewsheds based on the imputed location fixes and determining intersections between the mobile viewsheds and a fixed viewshed defined for a digital billboard.

17. The method of claim 16, further comprising, for each different home census block, determining an adjusted count of intersections based on multiplying a count of mobile communication devices that receive wireless communication service from a wireless communication service provider and whose mobile viewshed is evaluated as intersecting the fixed viewshed of the digital billboard by a reciprocal of the fraction of wireless communication service market penetration of the mobile communication service provider in the home census block.

18. The method of claim 16, wherein the cluster having the longest dwell time is deemed a home cluster of the mobile communication device.

19. The method of claim 18, wherein the home census block of the mobile communication device is a United States census block area that contains the centroid of the home cluster of the mobile communication device.

\* \* \* \* \*